(12) United States Patent
Ouchi

(10) Patent No.: US 7,019,627 B2
(45) Date of Patent: Mar. 28, 2006

(54) DEVICE FOR DETECTING SLOPE OF VEHICLE OR THE LIKE

(75) Inventor: Junichi Ouchi, Kanagawa (JP)

(73) Assignee: Macnica, Inc., Kanagawa (JP)

( * ) Notice: Subject to any disclaimer, the term of this patent is extended or adjusted under 35 U.S.C. 154(b) by 123 days.

(21) Appl. No.: 10/681,997

(22) Filed: Oct. 8, 2003

(65) Prior Publication Data

US 2005/0078000 A1    Apr. 14, 2005

(51) Int. Cl.
*B60Q 1/00* (2006.01)

(52) U.S. Cl. .......................... 340/440; 701/38
(58) Field of Classification Search ................ 340/440, 340/441, 429; 701/1, 38, 70
See application file for complete search history.

(56) References Cited

U.S. PATENT DOCUMENTS 6,417,767 B1 *   7/2002  Carlson et al. ............. 340/467
6,614,343 B1 *   9/2003  Fennel et al. ............. 340/425.5
6,856,868 B1 *   2/2005  Le et al. ....................... 701/38

* cited by examiner

*Primary Examiner*—John Tweel, Jr.

(57) ABSTRACT

The slope detecting device includes means for detecting a horizontal acceleration of the vehicle; means for detecting perpendicular acceleration to the running direction of the horizontal detecting means; and means for detecting, relatively to the horizontal detecting means and perpendicular detecting means, the acceleration-deceleration of the moving object by whether the sum of squares respectively which the acceleration detected by the horizontal detecting means and the acceleration detected by the perpendicular detecting means is equal to the second power of gravity acceleration, and calculating the slope of the vehicle in acceleration-deceleration so that it can detect the slope of vehicle in acceleration-deceleration as well as during running the vehicles at a constant speed.

2 Claims, 5 Drawing Sheets

DEVICE FOR DETECTING SLOPE OF VEHICLE OR THE LIKE

BACKGROUND OF THE INVENTION

This invention relates to a device for detecting a slope traveled by vehicles such as a car, train or the like.

In order to detect whether the moving object such as the car, train or the like passes over the sloped road, the acceleration sensor of one axis is used and the slope is detected by the conventional car navigation system.

Therefore, although the acceleration sensor correctly detects the slope traveled by the moving objects such as the conventional car and a train during running the vehicles at a constant speed, the slope cannot be measured correctly since acceleration followed in acceleration-deceleration.

SUMMARY OF THE INVENTION

Accordingly, it is an object of the invention to provide a device that can detect the slope of a vehicle or the like in acceleration-deceleration as well as during running the vehicles at a constant speed.

Novel features which are believed to be characteristic of the invention, both as to its organization and method of operation, together with further objects and advantages thereof, are described below with reference to the accompanying drawings in which preferred embodiments of the invention are illustrated as an example.

It is to be expressly understood, however, that the drawings are for the purpose of illustration and description only, and are not intended as a definition of the limits of the invention.

BRIEF DESCRIPTION OF THE DRAWINGS

Accompanying the specification are figures which assist in illustrating the embodiments of the invention, in which.

DETAILED DESCRIPTION OF THE PREFERRED EMBODIMENTS

Figure 1:
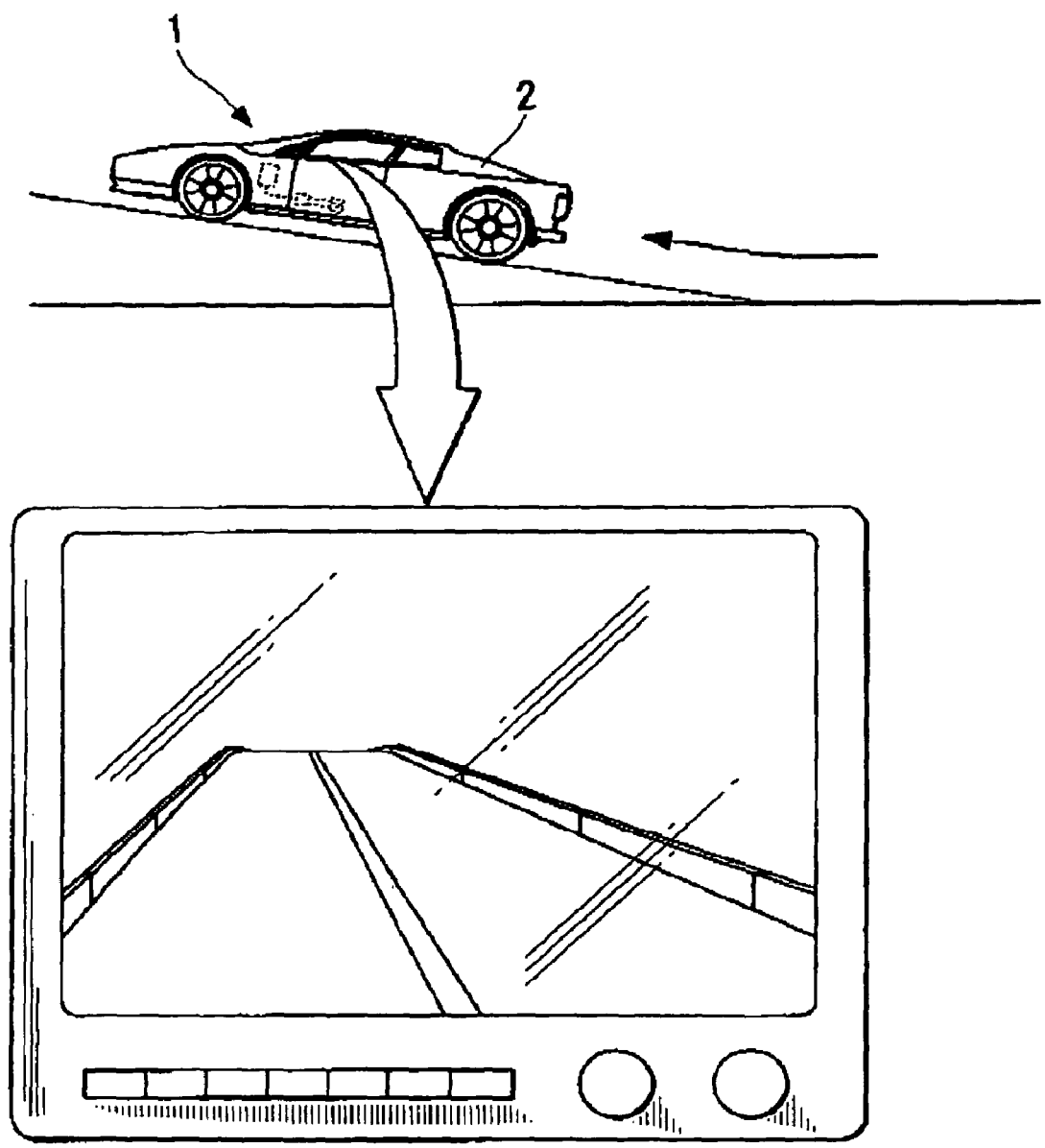
FIG. 1 is a schematic diagram of the first embodiment of the present invention.
Figure 2:
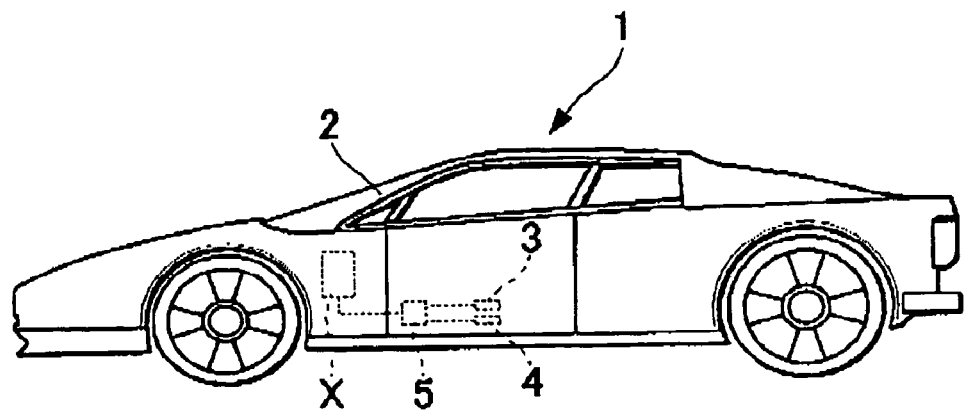
FIG. 2 is an example of the first embodiment.
Figure 3:
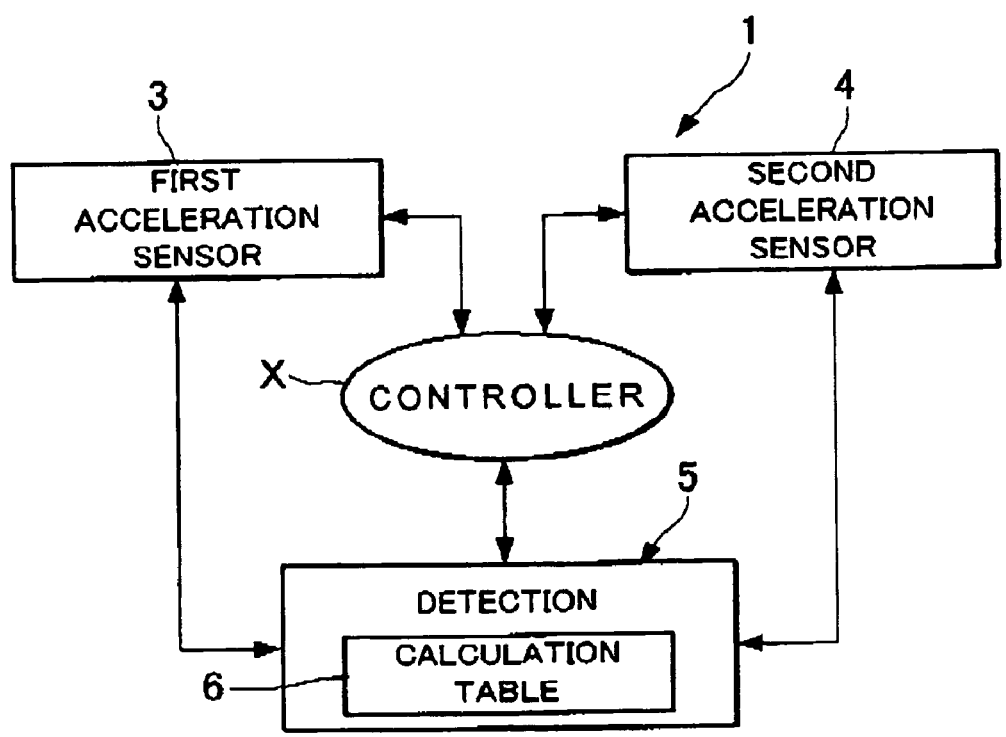
FIG. 3 is a block diagram illustrating the first embodiment.

Preferred embodiments of the present invention are described in more detail below with reference to the accompanying drawings.

An understanding of the present invention may be best gained by reference to FIGS. 1–4. FIGS. 1–4 illustrate a device for detecting a slope traveled by vehicles in accordance with a first embodiment of the present invention. Reference numeral 1 shows the device for detecting the slope, the device attached in the moving object including a car, a motorcycle, train or the like.

The slope detecting device 1 is comprised of a first acceleration sensor 3 as a horizontal detecting means to detect the acceleration of the running direction of the moving object 2, a second acceleration sensor 4 as a perpendicular detecting means to detect perpendicular acceleration to the running direction of the first acceleration sensor 3; means 5 for detecting, relatively to the first acceleration sensor 3 and second acceleration sensor 4, the acceleration-deceleration of the moving object 2 by whether the sum of squares respectively which the acceleration detected by the first acceleration sensor 3 and the acceleration detected by the second acceleration sensor 4 is equal to the second power of gravity acceleration, and calculating the slope of the moving object in acceleration-deceleration.

Although the first and the second acceleration sensors 3 and 4 are used for the same acceleration sensor as usual in this embodiment, it should just be a sensor that can detect acceleration and gravity efficiently.

Moreover, the attachment position of the first and the second acceleration sensors 3 and 4 is attached suitably and relatively to the control part installed in the moving object 2. In this case, they are attached through wiring, and they may be used by a radio system.

The detecting means 5 is attached relatively and suitably through wiring to the control part X installed in the moving object 2 as the first and second acceleration sensors 3 and 4. Also it may be used by a radio system.

Moreover, the detecting means 5 includes a calculation table 6 which detects the acceleration-deceleration of the moving object 2 by whether the sum of squares respectively which the acceleration detected by the first acceleration sensor 3 and the acceleration detected by the second acceleration sensor 4 is equal to the second power of gravity acceleration, and calculating the slope of the moving object in acceleration-deceleration.

Figure 4:
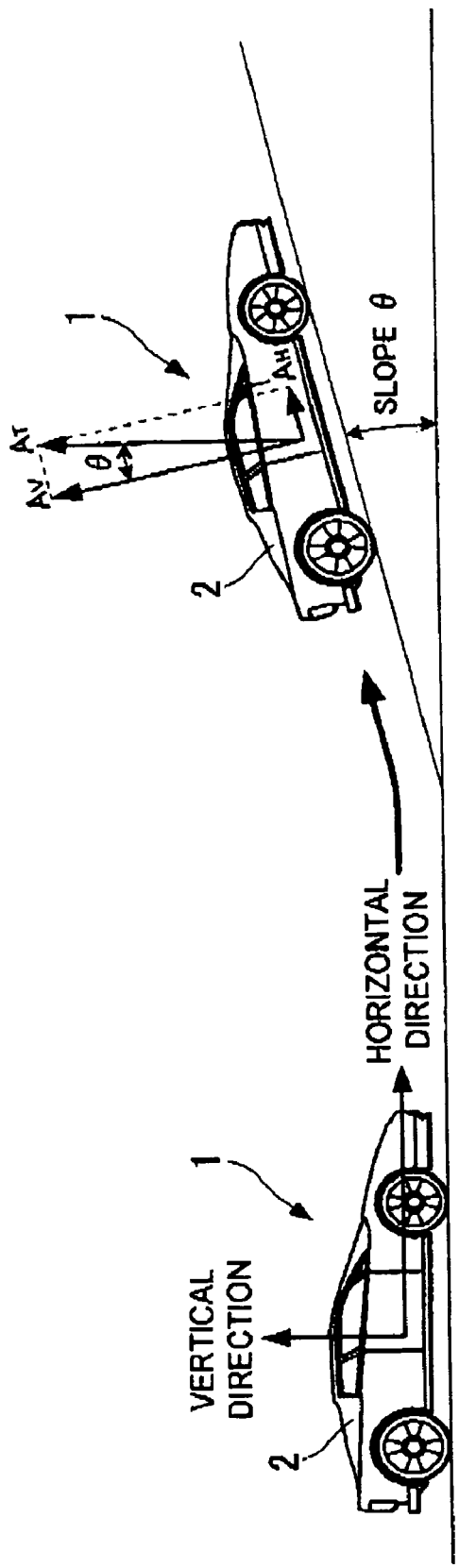
FIG. 4 is an example of a formula for a calculation table illustrating the first embodiment.

The formula that constitutes this calculation table is explained in FIG. 4.

In FIG. 4, $A_H$ shows the horizontal acceleration of the moving object 2 (acceleration detected by the first acceleration sensor 3); $A_V$ shows the perpendicular acceleration of the moving object 2 (acceleration detected by the second acceleration sensor 4); and $A_T$ shows the synthetic acceleration of $A_H$ and $A_V$.

Since only gravity acceleration add to the acceleration sensor when the moving object 2 is carrying out uniform operation, the related formula is formed as below:

$$A_G^2 = A_H^2 + A_V^2$$

Here, $A_G$ shows the gravity acceleration.

Then, the slope $\theta$ of the moving object 2 is:

$$\theta = TAN^{-1}(A_H/A_V)$$

Next, during the moving object 2 runs in acceleration-deceleration, the formula is formed as below:

$$A_G^2 \neq A_H^2 + A_V^2$$

However, the perpendicular acceleration $A_V$ of the moving object 2 is not influenced of the acceleration accompanying acceleration-deceleration of the moving object.

Therefore, the slope of the moving object 2 is calculated as below:

$$\theta = COS^{-1}(A_H/A_G)$$

Also the acceleration $A_C$ accompanying acceleration-deceleration of the moving object at this time is calculated by:

$$A_C = A_H - (A_G^2 - A_V^2)^{1/2}$$

By using the slope calculation table 6, the slope traveled by the vehicle in acceleration-deceleration can be calculated by the acceleration detected by the first acceleration sensor 3 and the acceleration detected the second acceleration sensor 4 of the second detected.

In addition, in this embodiment, the detecting means 5 is explained that it is installed separately in the control part X as the car-mounted computer which controls the fuel injection, timing, etc mounted on the moving object 2. In addition, the detecting means 5 may be installed in the control part X integrally.

Therefore, it can be installed into the GPS, car-mounted computer and the like as usual.

The slope detection equipment 1 of the above-mentioned composition detects the slope of the moving object 2 by the first acceleration sensor 3 that detects the horizontal acceleration in uniform operation.

When the moving object 2 passes through the road with the degree of slant, two-level crossing, etc., the speed of the moving object is accelerated or decelerated. In this case, the first acceleration sensor 3 detects the acceleration of the run direction, and the second acceleration sensor 4 detects the perpendicular acceleration to the run direction.

The slope of the moving object 2 can be correctly detected through the slope calculation table 6 of the detecting means 5 based on the detected acceleration so that the slope of the moving object 2 is correctly measured corresponding to the acceleration-deceleration as it passes over the slope.

Other embodiments of the present invention will now be described with reference to FIGS. 5–8. In FIGS. 5–8, the same components as in the first embodiment described above with reference to FIGS. 5–8 are designated by the same reference numerals and therefore will not be further explained in great detail.

Figure 5:
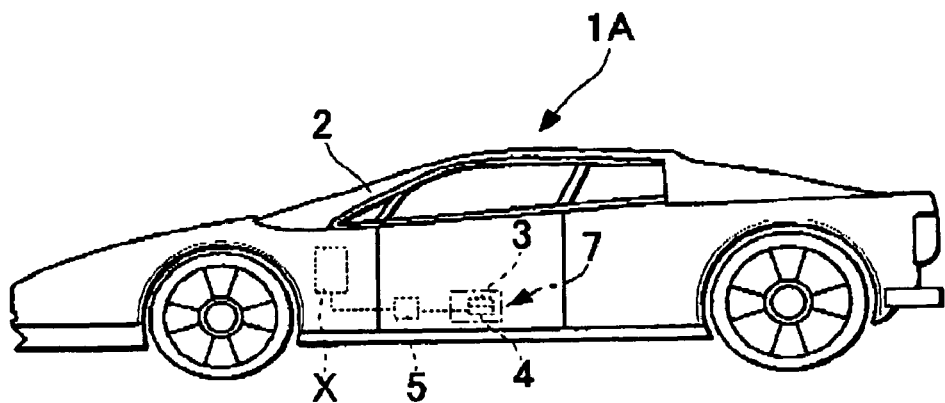
FIG. 5 is an example of the second embodiment.
Figure 6:
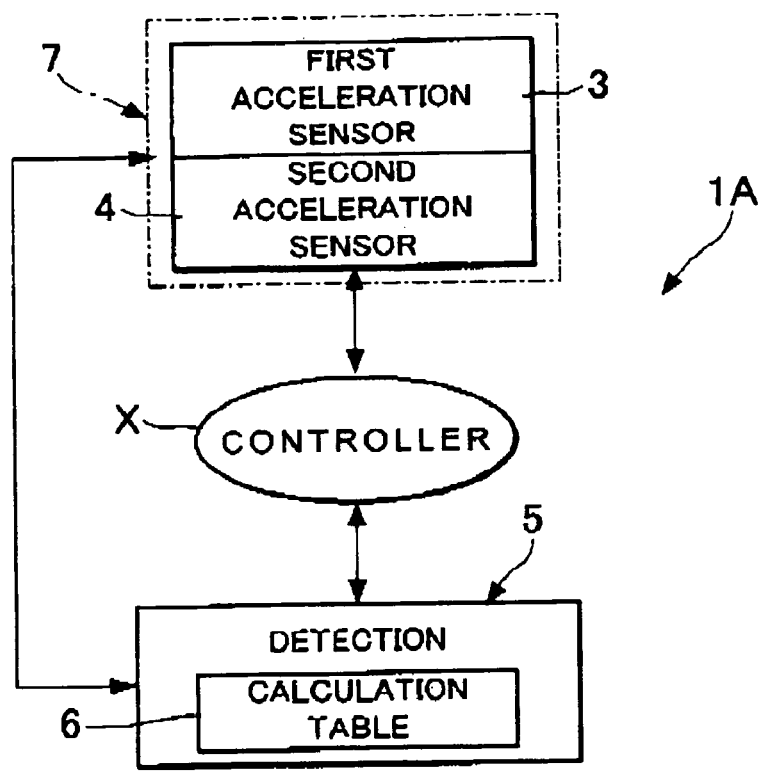
FIG. 6 is a block diagram illustrating the second embodiment.

A second embodiment of the present invention is shown in FIGS. 5 and 6. It is distinguished from the first embodiment in that means 7 for detecting is used, and the detecting means 7 includes the first acceleration sensor 3 as a horizontal detecting means to detect the acceleration of the running direction of the moving object 2; the second acceleration sensor 4 as a perpendicular detecting means to detect perpendicular acceleration to the running direction of the first acceleration sensor 3, provided at the first acceleration sensor 3 integrally. A device for detecting slope of the vehicles 1A according to the second embodiment has similar advantages to that according to the first embodiment and the installation space can be reduce.

In addition, one acceleration sensor that can detect a horizontal acceleration and perpendicular acceleration may be used.

Figure 7:
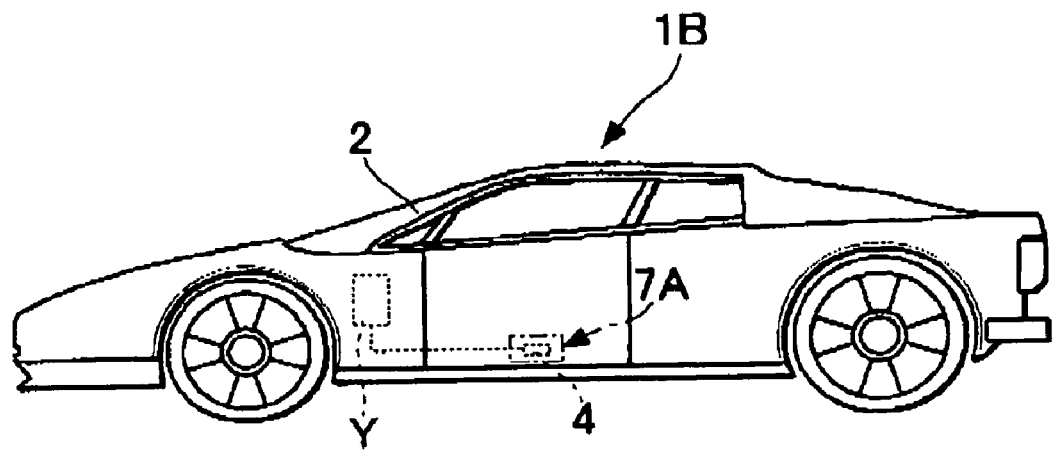
FIG. 7 is a an example of the third embodiment.
Figure 8:
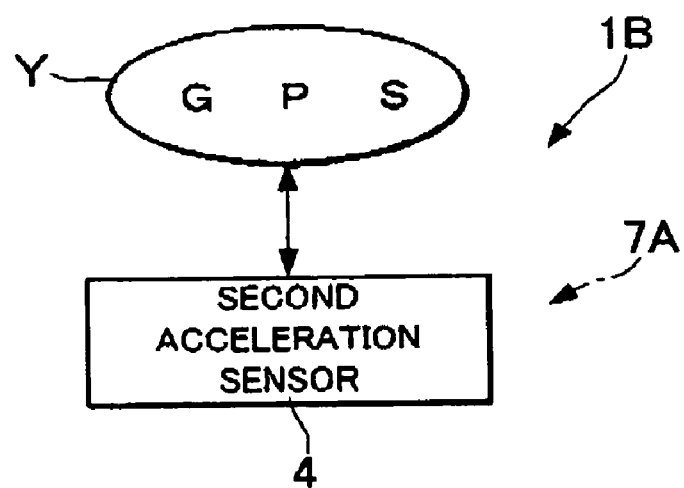
FIG. 8 is a block diagram illustrating the third embodiment.

A third embodiment of the present invention is shown in FIGS. 7 and 8. It is distinguished from the second embodiment in that a detecting means 7A including the second acceleration sensor 4 to detect perpendicular acceleration is installed into the GPS, car-mounted computer and the like as usual, capable of detecting the horizontal acceleration. A device for detecting slope of the vehicles 1B according to the third embodiment has similar advantages to that according to the second embodiment.

Furthermore, although each embodiment differs as explained the same effect is achieved.

As set forth above, the advantages of the invention are as follows:

(1) The slope detecting device includes means for detecting a horizontal acceleration, mounted on a vehicle, detecting the acceleration of the running direction of the vehicle; means for detecting perpendicular acceleration to the running direction of the horizontal detecting means; and means for detecting, relatively to the horizontal detecting means and perpendicular detecting means, the acceleration-deceleration of the vehicle by whether the sum of squares respectively which the acceleration detected by the horizontal detecting means and the acceleration detected by the perpendicular detecting means is equal to the second power of gravity acceleration, and calculating the slope of the vehicle in acceleration-deceleration so that the slope of the vehicle can be correctly detected through the slope calculation table of the detecting means based on the detected acceleration so that the slope of the vehicle is correctly measured corresponding to the acceleration-deceleration as it passes over the slope.

(2) As discussed above, since it has a simple structure, it can be carried out easily and inexpensively installed.

(3) As discussed above, the slope calculation that is suitable for each situation can be performed efficiently during a uniform operation or acceleration-deceleration operation.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. A device for detecting slope of the vehicles comprising:
   means for detecting a horizontal acceleration, mouted on a moving object, detecting the acceleration of the running direction of the moving object;
   means for detecting perpendicular acceleration to the running direction of the horizontal detecting means; and
   means for detecting, relatively to the horizontal detecting means and perpendicular detecting means, the acceleration-deceleration of the moving object by whether the sum of squares respectively which the acceleration detected by the horizontal detecting means and the acceleration detected by the perpendicular detecting means is equal to the second power of gravity acceleration, and calculating the slope of the moving object in acceleration-deceleration.

2. A device for detecting slope of the vehicles comprising:
   means for detecting including a means for detecting a horizontal acceleration of the moving object and means for detecting perpendicular acceleration to the running direction of the horizontal detecting means, provided at the horizontal detecting means integrally; and
   means for detecting, relatively to the detecting means, the acceleration-deceleration of the moving object by whether the sum of squares respectively which the acceleration detected by the horizontal detecting means and the acceleration detected by the perpendicular detecting means is equal to the second power of gravity acceleration, and calculating the slope of the moving object in acceleration-deceleration.

* * * * *